United States Patent
Dabrowski et al.

(10) Patent No.: US 10,503,224 B2
(45) Date of Patent: Dec. 10, 2019

(54) METHOD FOR OPERATING A FLOWMETER AND FLOWMETER

(71) Applicant: KROHNE Messtechnik GmbH, Duisburg (DE)

(72) Inventors: Markus Dabrowski, Duisburg (DE); Helmut Brockhaus, Oberhausen (DE)

(73) Assignee: KROHNE MESSTECHNIK GMBH, Duisburg (DE)

(*) Notice: Subject to any disclaimer, the term of this patent is extended or adjusted under 35 U.S.C. 154(b) by 80 days.

(21) Appl. No.: 15/628,971

(22) Filed: Jun. 21, 2017

(65) Prior Publication Data
US 2017/0371387 A1  Dec. 28, 2017

(30) Foreign Application Priority Data
Jun. 23, 2016  (DE) .................. 10 2016 111 509

(51) Int. Cl.
G06F 1/20 (2006.01)
G01F 25/00 (2006.01)
G01F 1/00 (2006.01)

(52) U.S. Cl.
CPC ............... *G06F 1/206* (2013.01); *G01F 1/00* (2013.01); *G01F 25/0007* (2013.01); *G05B 2219/25428* (2013.01)

(58) Field of Classification Search
CPC .............................. G01F 25/0007; G01F 1/00
See application file for complete search history.

(56) References Cited

U.S. PATENT DOCUMENTS 6,799,476 B2 * 10/2004 Brockhaus ............ G01F 1/8431
73/861.356
6,954,717 B2  10/2005 Boldt et al.
(Continued)

FOREIGN PATENT DOCUMENTS

JP   2014-215211 A   11/2014
WO  2011/131752 A1   10/2011
WO  2012/065808 A1    5/2012

OTHER PUBLICATIONS

Hemal Desai, Foundation Fieldbus Devices & Namur NE 107, Sep. 21, 2011, XP055418137, Found URL:http://www.fieldbus.org/images/stories/international/asiapacific/Inida/presentations/a2011_7_ff_devices_namur_107.pdf [found on Oct. 23, 2017], the whole document.

*Primary Examiner* — Ryan D Walsh
(74) *Attorney, Agent, or Firm* — David S. Safran; Roberts Mlotkowski Safran Cole & Calderon, P.C.

(57) ABSTRACT

A method for operating a flowmeter having at least one diagnostic unit, a counter unit and a storage unit with at least one memory for carrying out a plurality of time-limited measuring operations during which the counter unit determines at least the overall volume of a fluid passing through the flowmeter during one measuring operation. The counter unit is operated for the duration of a time-limited measuring operation, and the diagnostic unit recognizes at least one erroneous or error-free state of the flowmeter. The method ensures a particularly high reliability of the measured values determined during an individual measuring operation by the diagnostic unit generating at least one status message based on the state that is transmitted to the storage unit and stored in the memory, and by several status messages being transmitted and cumulatively stored in the memory at least for the duration of the measuring operation.

10 Claims, 2 Drawing Sheets

(56) References Cited

U.S. PATENT DOCUMENTS

| | | |
|---|---|---|
| 9,109,936 B2 | 8/2015 | Drahm et al. |
| 2009/0187356 A1* | 7/2009 | Artiuch ............... G01F 25/0053 702/45 |
| 2010/0117829 A1* | 5/2010 | Mayer .................. G01F 1/6983 340/540 |
| 2010/0164717 A1 | 7/2010 | Hammer et al. |
| 2013/0069792 A1* | 3/2013 | Blevins ................. G05B 17/02 340/815.4 |
| 2014/0215167 A1* | 7/2014 | Ochiai ................. G05B 19/042 711/154 |

* cited by examiner

__METHOD FOR OPERATING A FLOWMETER AND FLOWMETER__

BACKGROUND OF THE INVENTION

Field of the Invention

The invention relates to a method for operating a flowmeter, wherein the flowmeter has at least one diagnostic unit, one counter unit and a storage unit with at least one memory, wherein the counter unit determines at least the overall volume of a fluid passing through the flowmeter during a measuring operation, and wherein the counter unit is operated for the duration of a time-limited measuring operation, wherein the diagnostic unit recognizes at least one erroneous or error-free state of the flowmeter. Additionally, the invention is based on a flowmeter having the above-mentioned features.

Description of Related Art

Field devices in general are used in process and automation technology as actuators or as sensors for determining process variables, wherein the information determined by the field device is used either for controlling or regulating the process or is made otherwise available for the process and/or user, for example is visually displayed.

In order to ensure an error-free determination of measured values, field devices are subject to particularly stringent requirements with respect to their functional safety/susceptibility to errors as well as to error diagnosis. If a malfunction occurs, it is highly relevant for the assessment of the quality of the measured values determined by the field device that the functional disturbance is communicated to the user, so that he can take corresponding measures for troubleshooting.

It is therefore known from the prior art to operate field devices with self-monitoring and/or self-diagnosis, whereby it can be ensured that, in the event of a malfunction, this is directly communicated to the user, so that the user can assess the quality of the output measured values.

In detail, the present invention relates to a method for operating a flowmeter which can be used, in particular, as a field device. According to the invention, the flowmeter comprises a counter unit which directly or indirectly determines a measured value for the current volume passing through the flowmeter, for example, from the measured values of the measured variables mass flow rate and density of a fluid, and also adds up the total volume passing through the flowmeter during a time-limited measuring operation. By specifying the total volume, each point in time of the measuring operation can be determined exactly. In this respect, a chronological mapping of the measuring operation is possible on the basis of the total volume.

The diagnostic unit of the flowmeter recognizes at least one erroneous or error-free state of the flowmeter. Erroneous states are, for example, defects in the electronics, (unacceptable) configuration changes, exceeding or falling below the operating temperature, wear, inadmissible vibration or shock, etc. A list of erroneous states of field devices is given in the NAMUR recommendations NE 107.

German Patent Application DE 10 2007 026 244 A1 and corresponding U.S. Patent Application Publication 2010/0164717 A1 disclose a method for creating an error profile for a field device, in particular for a flowmeter, wherein the error profile can be defined by the user in an application-specfic manner via an interface. The defined error profile is stored in a memory and accordingly error messages selected by the user are output by the field device in the event of their occurence.

German Patent Application DE 10 2010 044 184 A1 and corresponding International Patent Application Publication WO 2012/065808 A1 disclose a method for creating a diagnosis of a field device of a system that has a plurality of field devices which are in communication with each other. A diagnostic message is automatically generated by the field device and evaluated after a validation algorithm has been applied.

It is disadvantageous in the above-described methods that the error messages are output or displayed only directly, i.e., only at the point in time of the occurrence of the error. It is not possible to trace the occurrence of certain errors or malfunctions with a temporal offset. In particular, the repeated short-term occurrence of different error messages in the course of individual, time-limited measuring operations can be difficult to retrace, even in the case of continuous monitoring of the field device.

SUMMARY OF THE INVENTION

Based on the previously described prior art, it is thus the object of the present invention to provide a method for operating a flowmeter which ensures a particularly high observability and reliability of the measured values determined during individual measuring operations.

According to a first teaching of the present invention, the object described above is achieved by a method of the type initially mentioned in which the diagnostic unit generates at least one status message based on the state of the flowmeter and the status message is transmitted to the storage unit and stored in the memory of the storage unit, and in which, insofar as several status messages are transmitted, they are cumulatively stored in the memory of the storage unit at least for the duration of the measuring operation.

In the method according to the invention, the basic principle is that, in the determination of individual measured values, erroneous or error-free states also have an effect on the reliability of variables derived from these measured values. For example, an erroneous determination of the mass flow has an effect on the volume of the fluid determined therefrom. Preferably, the status message output by the diagnostic unit, insofar as it corresponds to an error message, also contains information about the cause of the error, which simplifies troubleshooting for the user.

The status of the measured variable determined by the counter unit preferably corresponds to an aggregation of status messages which are recorded during the measuring operation.

A cumulative storage of the status messages can, for example, be implemented by means of an "or" connection of individual status messages.

According to the invention, it has been recognized that the evaluation of an entire measuring operation or the evaluation of measured values that are determined during the measuring operation can be carried out by cumulatively storing individual status messages occurring during the duration of the measuring operation and that these status messages are are made available to the user after termination of the measuring operation. It is particularly advantageous that the status messages are available even if, for example, the erroneous state of the flowmeter no longer persists. Overall, a chronological documentation of the status messages can be provided with the The method according to the invention.

At the same time, it can be ensured by the The method according to the invention that even briefly occurring status messages, which, for example, indicate a short-term malfunction, do not pass unnoticed, but can also be reported to the user when the malfunction no longer exists. In this respect, the user can also take measures after the measuring operation to correct the error or to prevent a renewed occurrence of a particular status message.

As a result, the The method according to the invention provides a particularly reliable method for the determination of measured values of individual measuring operations.

According to a first advantageous implementation, the memory of the storage unit is erased before the start of a new measuring operation. This makes it possible to ensure that the following measuring operation is not incorrectly assigned to status messages which have not occurred during this measuring operation. The reliability of the assessment of individual measuring operations can thus be further increased. It is particularly preferred if at least a second memory is provided and the status messages stored in the first memory are transferred to the second memory before they are deleted.

According to an alternative embodiment, the memory of the storage unit is deleted after termination of the measuring operation. It is also advantageous if a second memory is provided in which the stored status messages are stored before they are deleted from the first memory.

Furthermore, it is advantageous if the diagnostic unit detects a plurality of erroneous or error-free states when the diagnostic unit assigns each state to at least one standardized state category, and when the status category is transmitted as a status message and stored in the memory of the storage unit. Standardized state categories of field devices are, in particular, the NAMUR recommendations NE 107. Accordingly, the following device states are distinguished:

normal
maintenance requirements
outside the specification
functional check
failure The advantage of such an assignment is that the individual states are, in particular, classified with regard to their importance. This is because not every status message requires action to correct a problem. In addition to the above-mentioned state categories, it is also possible to use further categories for assessing the measured value or the measuring operation. Other categories are also advantageous, such as:

initial value
value over-modulated
value under-modulated

The mentioned list of state categories is, naturally, not exhaustive.

In addition, it is advantageous if the diagnostic unit stores the state and the state category assigned to the state as a status message in the memory of the storage unit. This implementation advantageously takes into account that different information is relevant for different users. For example, for one user, only the information that maintenance is required is relevant, while the precise state for error correction is of interest to a further user.

In a next implementation of the The method according to the invention, at least individual states are assigned to more than one state category. This is useful, for example, if a functional error results in a measured value being outside the specification range, and at the same time, maintenance of the flowmeter is required.

Alternatively, it is also advantageous if each state is assigned to exactly one state category. If the user is notified of a particular state category after a measuring operation, the determination of the cause of error is particularly simple due to the clear assignment according to this implementation.

According to a further embodiment, a counter value is assigned to the state and/or the state category, and the state and/or the state category as well as the associated counter value, are stored in the memory of the storage unit. Such a counter value can be, for example, the current total volume. This has the advantage that after termination of the measuring operation, not only is it documented that a status message was available or is available, but it is also possible to trace when this status message occurred, wherein "when" is not exact time information, but rather is the continuously developing counter reading. This method variation ensures a high observability of the state of the field device in the form of a flowmeter. By linking to counter values, particular additional information is given, which gives a deeper insight into possible causes for the occurrence of the linked states. In particular, an arrangement of the status messages oriented chronologically or to the advancing counter level is stored in the memory of the storage unit. When certain status messages occur, the user can then assess whether the subsequently determined measured values are also affected by the status message and are thus to be discarded or handled otherwise.

Furthermore, it is advantageous when the counter unit has a display unit, and when the counter unit outputs the status message at least temporarily, in particular together with the counter value via the display unit. For example, it is advantageous when the counter unit indicates the status message, in particular with the counter value, for the duration of the existence of the erroneous or error-free state. In this manner, the user is informed very quickly about any malfunctions or interferences. In addition, the user can decide at an early stage whether he wants to terminate an error-prone measuring operation or if he wants to prematurely interrupt it.

It is likewise advantageous when the storage unit continuously provides the accumulated status messages during the time-limited measuring operation via an interface, preferably via a display unit or an internal interface. For this purpose, the storage unit preferably has a display unit via which the accumulated status messages are output continuously or at least at one time within the measuring operation, wherein the at least one time is not the termination of the measuring operation. It is also possible for the accumulated status messages to be retrieved or output via an internal interface at any time during a measuring operation. Based on the information that the user receives from the accumulated status messages during the measuring operation, the user can decide to stop a measuring operation at an early stage or to stop the flow without having to continuously monitor the measurement.

According to a further implementation of the method, the accumulated status messages are assigned to at least one counter value which is within the measuring operation, the status messages being accumulated up to this counter value, and the accumulated status messages are continuously made available together with the counter value during the time-limited measuring operation via an interface, preferably via a display unit or an internal interface. For this purpose, the storage unit preferably has a display unit, via which the accumulated status messages are continuously output together with the counter value or at at least one point in time within the measuring operation, wherein the at least one point in time does not correspond with the end of the measuring operation. It is also possible for the accumulated status messages together with the counter value to be always retrieved or output via an internal interface on request during a measuring operation. Based on the information obtained by the user as a result of the accumulated status messages and the counter value during the measuring operation, he can decide to terminate a measuring operation at an early stage or to stop the flow of the fluid without having to monitor the measurement continuously.

According to a further implementation of the method, the diagnostic unit evaluates the status messages accumulated in the storage unit during the time-limited measuring operation and triggers device-specific measures depending on the status messages which have occurred. For example, the dosing process or the flow of the fluid to be measured can be stopped when at least one previously determined status message occurs.

In a further development of the method, it is provided that the flowmeter outputs the status messages accumulated in the storage unit after termination of a measuring operation via a data interface of the flowmeter.

According to another further development of the method, it is provided that the diagnostic unit evaluates the status messages accumulated in the storage unit after termination of a time-limited measuring operation and triggers or carries out device-specific measures only at this time, i.e., after termination of the measuring operation, for example deactivation of the device, in particular in the form of blocking further measuring operations and/or blocking the flow of the fluid to be measured. This method has the advantage that a once-started, time-limited measuring operation can also be completed. This is particularly advantageous when the measuring device operated with the proposed method is used within the scope of a filling device, such as, for example, a pump system for fuel or fuel additives.

According to a second teaching of the present invention, the object mentioned in the introduction is also achieved by a flowmeter with a diagnostic unit for recognizing an erroneous or error-free state of the flowmeter and for generating and forwarding a status message, having a counter unit for determining the overall volume of a fluid flowing through the flowmeter during a measuring operation and having a storage unit having at least one memory, wherein the status message is stored in the memory of the storage unit and wherein insofar as several status messages are transmitted, they are stored cumulatively in the memory of the storage unit, at least for the duration of the measuring operation.

It is particularly preferred that the flowmeter is designed for carrying out one of the above-described methods. It is thus configured by suitable programming of the diagnosis unit that it actually carries out the above-described method, i.e., it is not possible to carry out the method theoretically merely because of its hardware configuration.

In detail there is a plurality of possibilities for designing and further developing the method and flowmeter according to the invention as will be apparent from the following description of preferred embodiments in conjunction with the accompanying drawings.

DETAILED DESCRIPTION OF THE INVENTION

Figure 1:
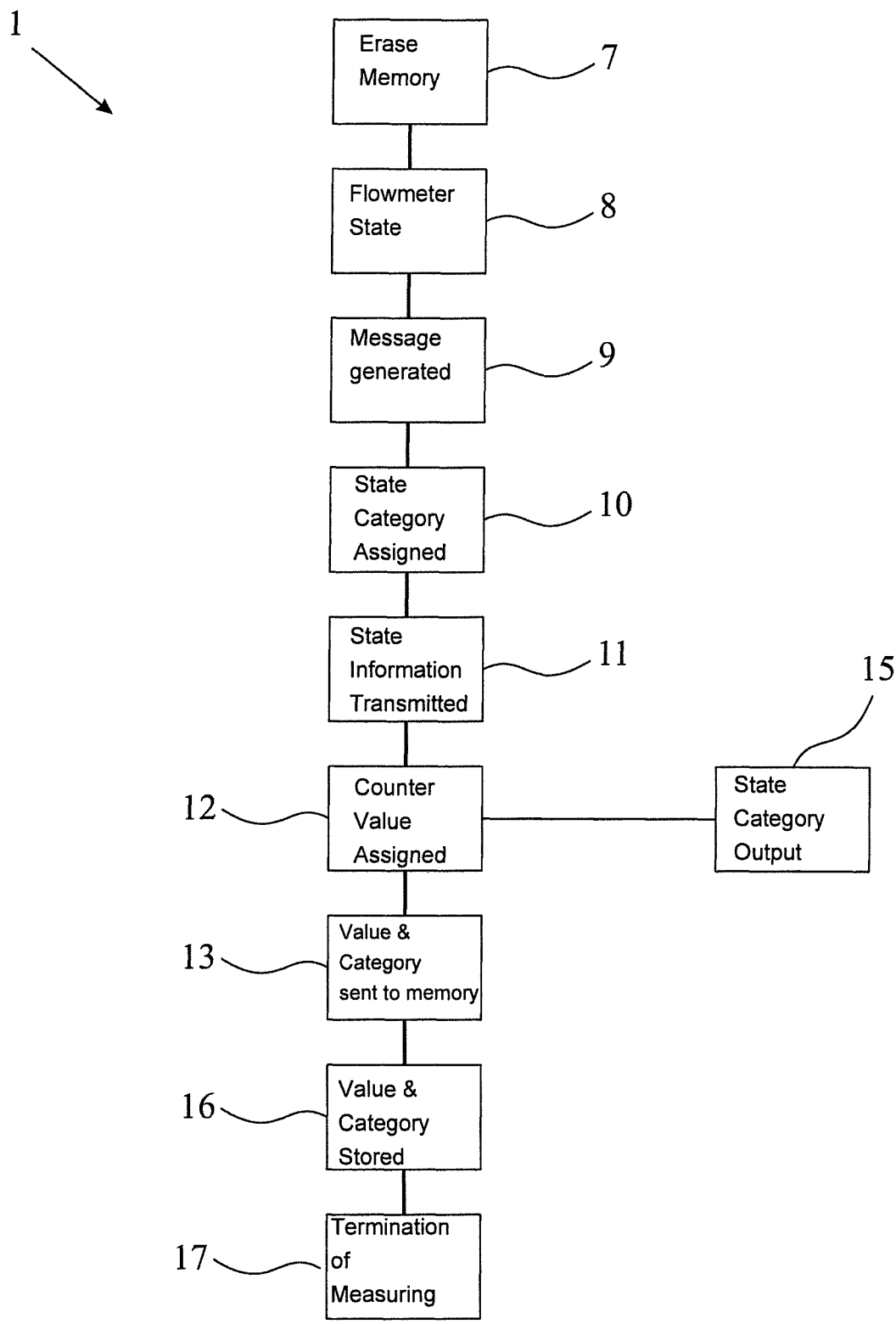
FIG. 1 is a flow chart of an embodiment of a method according to the invention and FIG. 2 is a diagrammatic depiction of an embodiment of a flowmeter according to the invention.

FIG. 1 shows a first embodiment of a method 1 according to the invention for operating a flowmeter 2, wherein the flowmeter 2 has at least one diagnostic unit 3, a counter unit 4 and a storage unit 5 with at least one memory 6, wherein the counter unit 4 determines at least the total volume of a fluid passing through the flowmeter 2 during a measuring operation, and wherein the counter unit 4 is operated for the duration of a time-limited measuring operation.

First of all, in a first step 7, the memory 6 of the storage unit 5 is erased before beginning a time-limited measuring operation. This measuring operation could, for example, be the extraction of a liquid from a dispensing pump.

In a next step 8, the diagnostic unit 3 recognizes an erroneous or error-free state of the flowmeter 2 and generates 9 a corresponding status message 9a based on the state.

In a next step 10, the diagnostic unit 3 assigns the state to a state category according to the NAMUR recommendations NE 107. The assignment is thereby carried out in such a manner that every state is assigned to exactly one state category.

In a following step 11, the diagnostic unit 3 transmits the state information and the state to the counter unit 4 in the form of a status message 9a. The counter unit 4 assigns 12 a counter value in the form of a current total flow to the status information and the status message 9a and forwards 13 the combination of the counter value, state category and state to the storage unit 5. At the same time, the counter unit 4 outputs 15 the state category and the state via a display unit 14. The storage unit 5 stores 16 the state category and the state together with the counter value.

After termination 17 of the measuring operation, the user is provided with a chronological aggregation of the status messages 9a which have occurred.

The method 1 according to the invention provides a method 1 for operating a flowmeter 2, which ensures a particularly high reliability of the determined measured values in time-limited measuring operations.

In a further method, the storage unit 5 has a display unit 14 or an internal interface via which the storage unit 5 already continuously outputs the accumulated status messages 9a together with the current overall flow during the measuring process.

Figure 2:
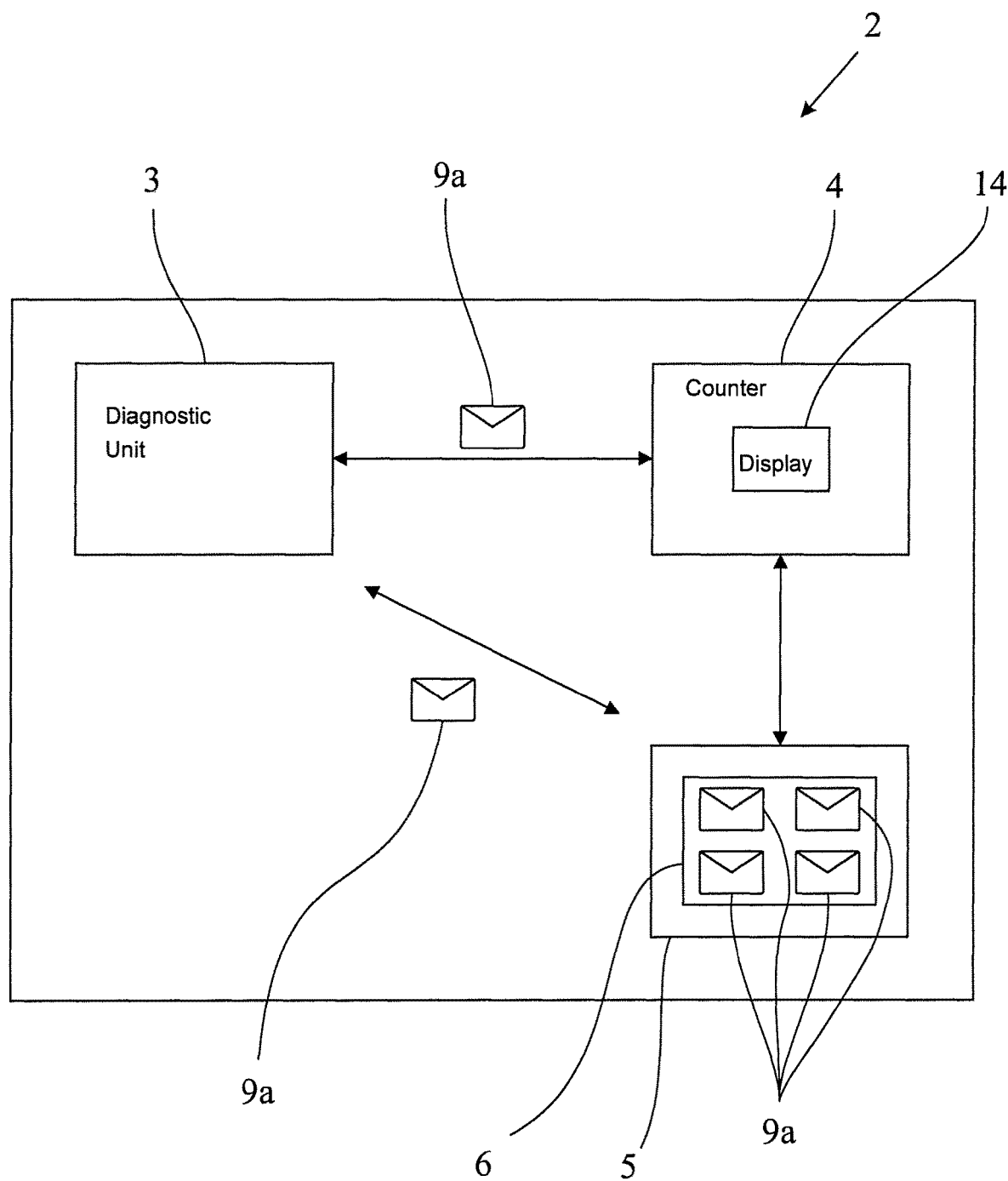

FIG. 2 shows an embodiment of a flowmeter 2 according to the invention having a diagnostic unit 3 for detecting an erroneous or error-free state and for generating and forwarding a status message, having a counter unit 4 for determining the volume passing through the flowmeter 2, and having a storage unit 5 with at least one memory 6, wherein the status message 9a is stored in the memory 6 of the storage unit 5 and, wherein insofar as several status messages 9a are transmitted, these are stored cumulatively in the memory 6 of the storage unit 5 at least for the duration of the measuring process. The illustrated flowmeter 2 is thereby designed for carrying out a The method according to the invention. In addition, the counter unit 4 has a display unit 14, via which the counter unit 4 outputs the status message 9a.

In detail, the flowmeter 2 is designed in such a manner that the status message 9a can be transmitted by the diagnostic unit 3 either directly to the storage unit 5 or indirectly via the counter unit 4 to the storage unit 5. All the structural units 3, 4, 5 are thereby designed in such a manner that they can act as transmitters or receivers.

In a next embodiment, the storage unit also has a display unit 14 or an internal interface, via which the storage unit 5 already continuously outputs the accumulated status messages 9a together with the current overall flow during the measuring operation.

What is claimed is:

1. A method for operating a flowmeter for carrying out a plurality of time-limited measuring operations, wherein the flowmeter has at least one diagnostic unit, a counter unit and a storage unit with at least one memory, the method comprising:

determining at least an overall volume of a fluid passing through the flowmeter during one of the plurality of time-limited measuring operations with the counter unit, the counter unit being operated for the time-limited duration of the measuring operation, recognizing at least one erroneous or error-free state of the flowmeter by the at least one diagnostic unit, the diagnostic unit generating status messages based on the state of the flowmeter recognized, transmitting the status messages to the storage unit and storing the status messages in the at least one memory of the storage unit, and when several status messages have been transmitted to the storage unit, cumulatively storing the status message in the at least one memory of the storage unit at least for the duration of the time-limited measuring operation, wherein the storage unit continuously provides accumulated status messages during the time-limited measuring operation via an interface, and wherein the status messages are deleted from the at least one memory of the storage unit before starting another of the time-limited measuring operation.

2. The method according to claim 1, wherein said recognizing of at least one erroneous or error-free state of the flowmeter by the diagnostic unit comprises recognizing a plurality of erroneous or error-free states and assigning each state to a standard state category and wherein a state category assigned is transmitted as status message and stored in the memory of the storage unit.

3. The method according to claim 2, wherein the diagnostic unit stores the state and the state category associated with the state as status message in the memory of the storage unit.

4. The method according to claim 3, wherein a counter value is assigned to at least one of the state and state category and wherein at least the state and state category as well as the counter value are stored in the memory of the storage unit.

5. The method according to claim 4, wherein accumulated status messages are assigned to at least one counter value which is within the time-limited measuring operation, the status messages being accumulated up to this counter value, and wherein the accumulated status messages are continuously made available together with the counter value during the measuring operation via an interface.

6. The method according to claim 1, wherein the counter unit has a display unit and wherein the status message is output by the counter unit via the display unit.

7. The method according to claim 1, wherein the diagnostic unit evaluates the status messages accumulated in the storage unit during the time-limited measuring operation and triggers device-specific measures depending on the status messages that have occurred, and stops the flow of the fluid to be measured when at least one previously determined status message occurs.

8. The method according to claim 1, wherein the diagnostic unit evaluates the status messages accumulated in the storage unit after termination of a time-limited measuring operation and after termination of the measuring operation, activates device-specific measures.

9. The method according to claim 8, wherein the device-specific measures comprise at least one of blocking measuring operations and blocking the flow of the fluid to be measured.

10. Flowmeter, comprising:

a diagnostic unit for recognizing an erroneous or error-free state of a time-limited flow measuring operation and for generating and forwarding status messages, a counter unit for determining overall volume of a fluid passing through the flowmeter during a measuring operation, and a storage unit with at least one memory for cumulatively storing status messages forwarded by the diagnostic unit for the duration of the measuring operation and an interface, wherein the storage unit continuously outputs accumulated status messages during the time-limited measuring operation via the interface, wherein the status messages are deleted from the at least one memory of the storage unit before starting another of the time-limited measuring operations.

* * * * *